United States Patent [19]

Liggett

[11] Patent Number: 4,509,239
[45] Date of Patent: Apr. 9, 1985

[54] METHOD OF FORMING A WHEEL

[75] Inventor: John V. Liggett, Plymouth, Mich.

[73] Assignee: Rockwell International Corporation, Pittsburgh, Pa.

[21] Appl. No.: 565,544

[22] Filed: Dec. 27, 1983

[51] Int. Cl.³ .............................................. B21D 53/32
[52] U.S. Cl. .............................. 29/159 A; 301/375 S
[58] Field of Search ............ 29/159 R, 159 A, 159.01; 301/375 S, 375 A, 37 R, 37 P

[56] References Cited

U.S. PATENT DOCUMENTS

| | | | |
|---|---|---|---|
| 4,063,783 | 12/1977 | Spisak | 301/37 R |
| 4,286,824 | 9/1981 | Brown | 301/375 S |
| 4,385,785 | 5/1983 | Norris et al. | 301/375 S |
| 4,397,504 | 8/1983 | Connell | 301/375 S |
| 4,452,493 | 6/1984 | Liggett | 301/375 S |

Primary Examiner—Howard N. Goldberg
Assistant Examiner—P. W. Echols

[57] ABSTRACT

A method of forming a wheel having a plurality of ornamental spoke elements on an outer side thereof includes the steps of providing a load supporting wheel portion having a mounting hub, a tire receiving rim and a radial wall portion extending therebetween. The radial wall portion is provided an axially extending, radially outwardly facing surface on the outer side. A radially inwardly open circumferential groove is formed on the outer side of the rim. A cylindrical element has a plurality of openings therein and is installed in the groove. A hub plate is formed to overlie the wall portion with an edge portion thereof being located radially outwardly of the axially extending surface. A plurality of spoke elements are formed with a hub end and a rim end with the rim end being installed in each of the openings and the hub end being installed against the axially extending surface. The hub plate is installed over the wall portion with the edge portion thereof entrapping the hub end of the spoke elements against the axially extending surface.

5 Claims, 5 Drawing Figures

METHOD OF FORMING A WHEEL

BACKGROUND OF THE INVENTION

1. Field of Invention

This invention relates to a method of forming a wheel and, more specifically, to such a method which includes the steps of providing ornamental spoke elements on an outer side thereof.

2. Description of the Prior Art

Although numerous wheels have heretofore been provided which include ornamental outer sides thereof, such wheels with a plurality of spoke elements continue to be aesthetically one of the more attractive and desirable designs. While some effort has been made to provide cast wheels which include simulated spoke elements, such as that disclosed in U.S. Pat. No. 3,884,527, these wheels are generally less attractive and more difficult and expensive to provide.

Accordingly, actual wire spoke wheels, ones which include spokes which are load supporting, still remain attractive. For example, U.S. Pat. Nos. 3,993,357; 4,019,782; 4,226,479; and 4,339,859 disclose such spoke wheels but make it clear from their teaching that providing such heavy duty, load supporting spokes can be quite complicated and expensive.

Accordingly, some effort has been made to provide the aesthetic quality of such spoke wheels without actually requiring that the wheel itself be made with load supporting spoke members. Specifically, removable wire wheel covers such as those disclosed in U.S. Pat. Nos. 4,168,016; 4,178,043; 4,221,436; and 4,229,048 have the advantage of providing the same aesthetic features without the structural complications required for real spoke wheels. However, such wire wheel covers have some inherent disadvantages. Specifically, since the cover is added to the wheel, there are problems with their accidental or intentional removal from the wheel resulting in a considerable loss to the owner. Although there are a number of means offered for preventing the unintentional removal of wire wheel covers, the cover generally must be removed for removing the wheel from the vehicle and removable security devices tend to add to the overall cost of the wire wheel covers.

Consequently, there are a number of wheel structures which include spoke elements which are not actual load bearing members. For example, U.S. Pat. Nos. 4,180,293; 4,226,478; and 4,385,785 disclose wheels which have a basic load supporting wheel portion with ornamental, non-load supporting spoke elements added thereto. While these wheels have the ornamental advantage of including spokes and the structural advantage of not requiring the spokes to be load supporting, they do include quite complicated and eloborate means for forming the wheel and securing the spokes thereto. As a result, there remains a need for providing a method of forming such a wheel which has a plurality of ornamental spoke elements on an outer side thereof which is relatively inexpensive and simple to provide.

SUMMARY OF THE INVENTION

It is therefore an object of this invention to provide a method of forming a wheel having a plurality of ornamental spoke elements on an outer side thereof wherein it is relatively inexpensive and simple to provide the spoke elements to a basic load supporting wheel.

This and other objects of the invention are provided in a preferred embodiment thereof including a method of forming a wheel having a plurality of ornamental spoke elements on an outer side thereof. The steps include providing the wheel with a mounting hub and a radial wall portion extending therefrom and terminating at a tire receiving rim. The radial wall portion is provided a cross sectional contour including at least one generally axially extending, radially outwardly facing surface on the outer side located radially between the hub and the rim. A radially inwardly opened circumferential groove is formed on the outer side of the rim. A hub plate is formed to overlie at least a portion of the wall portion with edge portions thereof being located radially outwardly of the axially extending surface. A plurality of spoke elements are formed having a hub end and a rim end. A cylindrical element is formed with a plurality of openings therein, which openings are each capable of receiving the rim end of one of the spoke elements. The cylindrical element is installed within the circumferential groove. The spoke elements are installed with the rim ends in corresponding openings in the cylindrical element and the hub ends resting against the axially extending surface. The hub plate is installed over the wall portion with the edge portions thereof entrapping the hub ends of the spoke elements against the axially extending surface and is then secured to the wheel.

DETAILED DESCRIPTION OF THE PREFERRED EMBODIMENT

Figure 1:
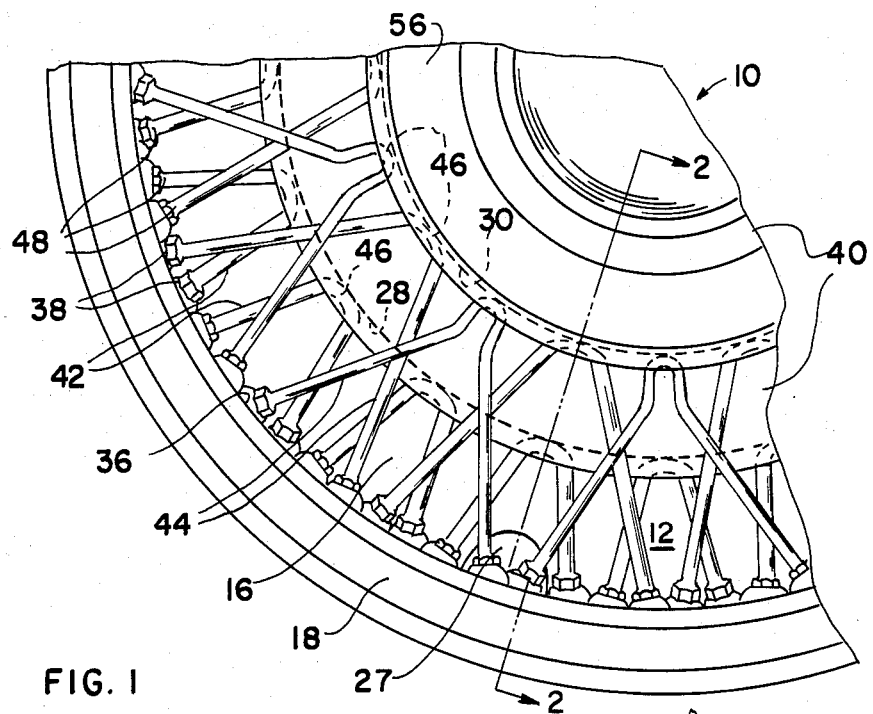
FIG. 1 is a fragmentary elevational view of a wheel which is formed by the preferred method.
Figure 2:
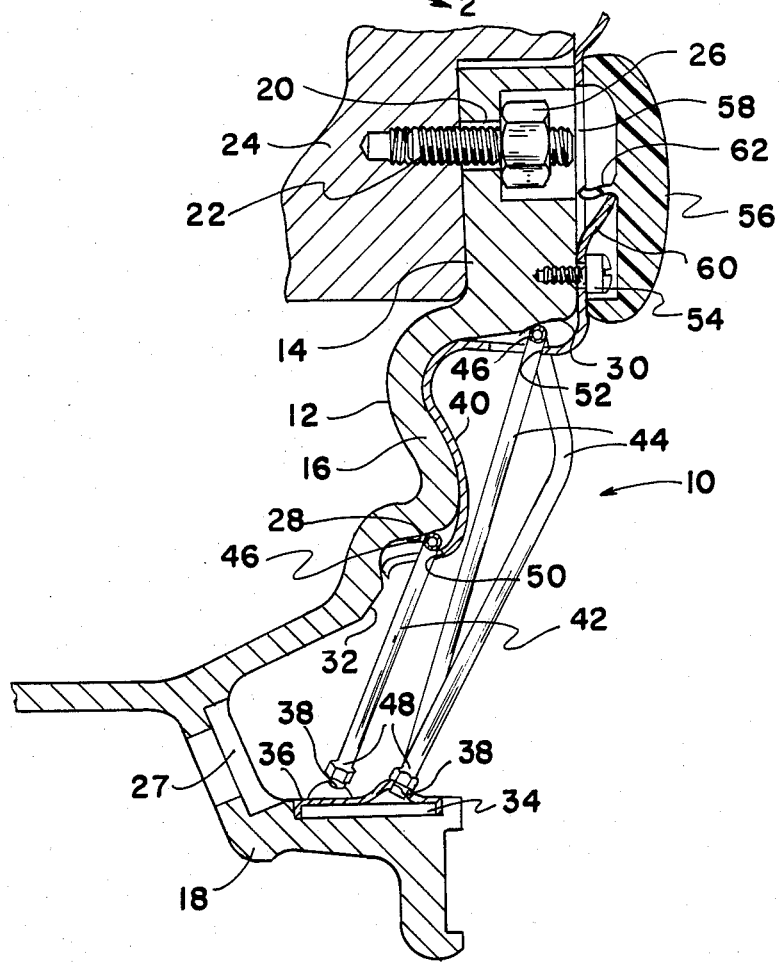
FIG. 2 is a view of the wheel of FIG. 1 as seen along line 2—2.

As seen in FIGS. 1 and 2, a preferred wheel 10 includes a basic load supporting wheel portion 12 which includes a mounting hub 14 and a radial wall 16 extending therefrom and terminating a tire-receiving rim 18. The hub 14 is provided a plurality of holes 20 which are positioned over corresponding studs 22 on an axle 24. The wheel 10 is secured to the axle 24 by a plurality of retaining nuts 26 securely mounted on the studs 22. A valve stem hole 27 is formed in the rim 18 to accommodate the vehicle tire (not shown) when it is mounted on the rim 18.

The preferred radial wall 16 includes a first generally axially extending, radially outwardly facing surface 28 and a second generally axially extending, radially outwardly facing surface 30 on the outer side 32 of the wheel 10. A radially inwardly opened circumferential groove 34 is formed on the outer side 32 of the rim 18 and is adapted to receive a cylindrical element 36 having a plurality of openings 38 therein. A hub plate 40 is formed of sheet metal to overlie at least a portion of the wall 16. When the hub plate 40 and the cylindrical element 36 are properly installed on the wheel portion 12, a plurality of spoke elements can be securely installed on the outer side 32 of the wheel 10 to provide the desired ornamental features.

Specifically, a first set of spoke elements 42 is provided a first length and a second set of spoke elements 44 is provided a second, longer length. Each of the spoke elements 42, 44 is provided a hub end 46 and a rim end 48. The rim end 48 of each spoke element 42, 44 is installed in a corresponding opening 38 in the cylindrical element 36. Because of the difference in the overall length of the spoke elements 42 and the spoke elements 44, the hub end 46 of the spoke elements 42 will rest against the first axially extending surface 28 while the hub end 46 of the spoke elements 44 will rest against the second axially extending surface 30.

To insure the hub ends 46 of the spoke elements 42, 44 will remain against their corresponding surfaces 28, 30, the hub plate 40 is provided two sets of edge portions to entrap the hub ends 46 against their corresponding surfaces 28, 30 in a manner which will prevent withdrawal of the rim ends 48 from the openings 38. Consequently, the hub plate 40 is provided a peripheral edge portion 50 which is located radially outwardly of the first axially extending surface 28 to entrap the hub end 46 of the spokes 42. A plurality of intermediate windows are provided around the hub plate 40 to provide intermediate edge portions 52 which are located radially outwardly of the second axially extending surface 30 to entrap the hub end 46 of each of the spoke elements 44. The hub plate 40 is retained in place by being rigidly installed over the wheel portion 16, preferably by being secured to the hub 14 by a plurality of screws 54.

To complete the wheel 10, a decorative annular ring 56, preferably made of plastic or some other suitable material, is removably installed over the holes 20, nuts 26 and screws 54 to prevent their being seen and detracting from the overall aesthetic features of the wheel 10. In the preferred configuration, the hub plate 40 is provided a series of openings 58 in alignment with the holes 20 to allow access to the nuts 26. A raised edge 60 of the hub plate 40 at each opening 56 is provided as a means for securing the annular ring 56 to the wheel 10. Specifically, a plurality of resilient finger elements 62 are provided around the interior of the annular ring 56 which can be aligned with and make gripping contact with each raised edge 60 when the annular ring 56 is being installed. A screwdriver or other similar tool could be utilized to withdraw the annular ring 56 from the position as shown in FIG. 2 to allow access to the nuts 26 for removal of the wheel 10 from the axle 24.

As thus described, the preferred wheel 10 includes the plurality of ornamental spoke elements for the desired decorative features while eliminating a number of the problems which existed for various prior art wheels which were intended to provide the same type of aesthetic appearance.

Figure 3:
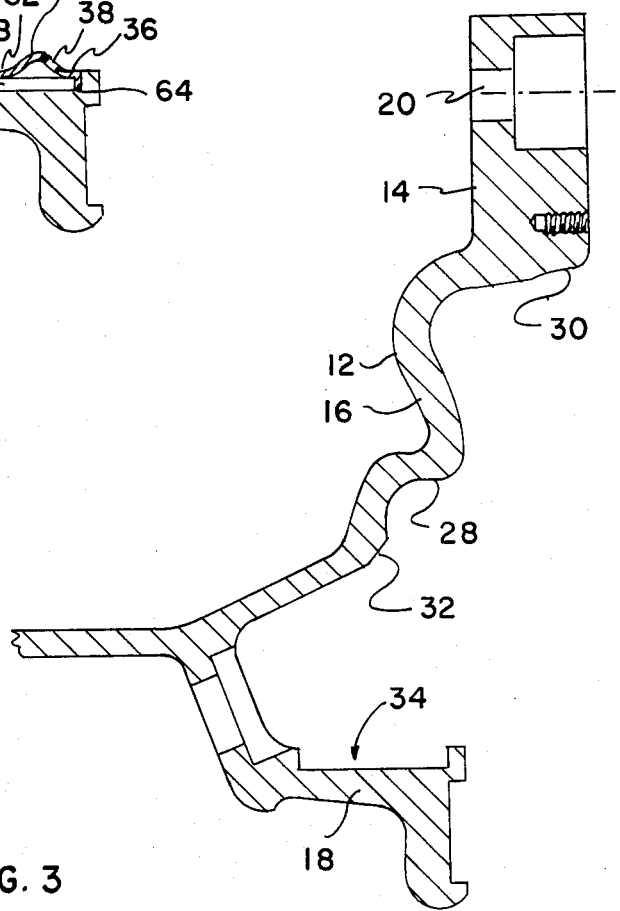
FIG. 3 is a view of the basic load supporting wheel structure as seen in FIG. 2.

To provide the preferred wheel 10, as seen in FIG. 3, the basic load supporting wheel portion 12 is cast of aluminum. Although aluminum is preferred to reduce the overall weight of the wheel 10, it can be seen that other material could be utilized without departing from the basic teaching of the invention. The axially extending, radially outwardly facing surfaces 28, 30 are provided during the casting without requiring any additional steps of formation. However, the circumferential groove 34 is provided by turning in a manner which is well known in the art. It has been found that turning the circumferential groove 34 in this manner does not significantly add to the complication of providing the overall wheel portion 12 since the outer side 32 in the region of the rim 18 must be turned to provide the aluminum with the type of surface characteristics which would be expected for an ornamental wheel.

Figure 4:
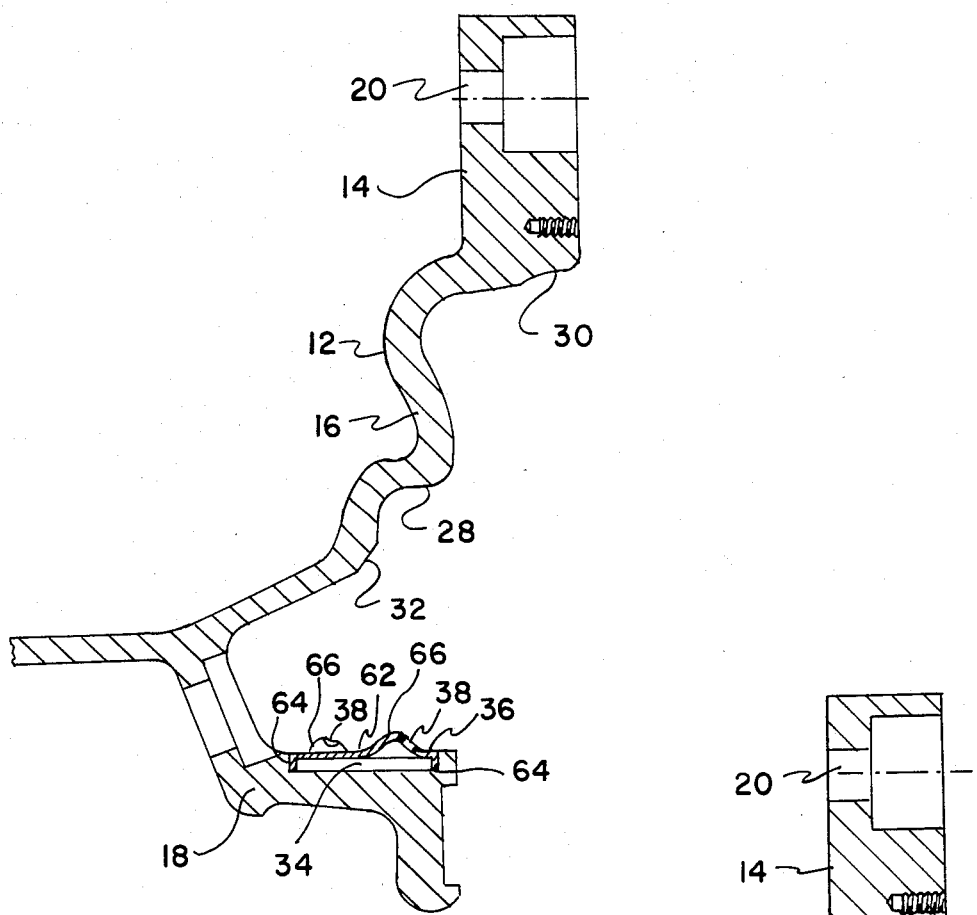
FIG. 4 is a view of the wheel as shown in FIG. 3 including the installation of the preferred cylindrical element.

As seen in FIG. 4, the cylindrical element 36 is formed of sheet aluminum and includes a cylindrical base portion 62 and a pair of radially extending flange portions 64. The cylindrical element 32 is formed as a discontinuous ring for easy installation within the circumferential groove 34 with the flange portions 64 being installed in and resting against a bottom of the circumferential groove 34. As the cylindrical element 36 is being stamped and formed, and the plurality of openings 38 are being formed therein, a raised portion 66 is provided around each of the openings 38. The raised portions 66 are designed to present the openings 38 in a transverse manner to each corresponding rim end 48 of the spoke elements 42, 44 to be received therein. Inclining the openings 38 in this manner will be seen to insure that the spoke elements 42, 44 will be securely retained at their rim ends 48.

Figure 5:
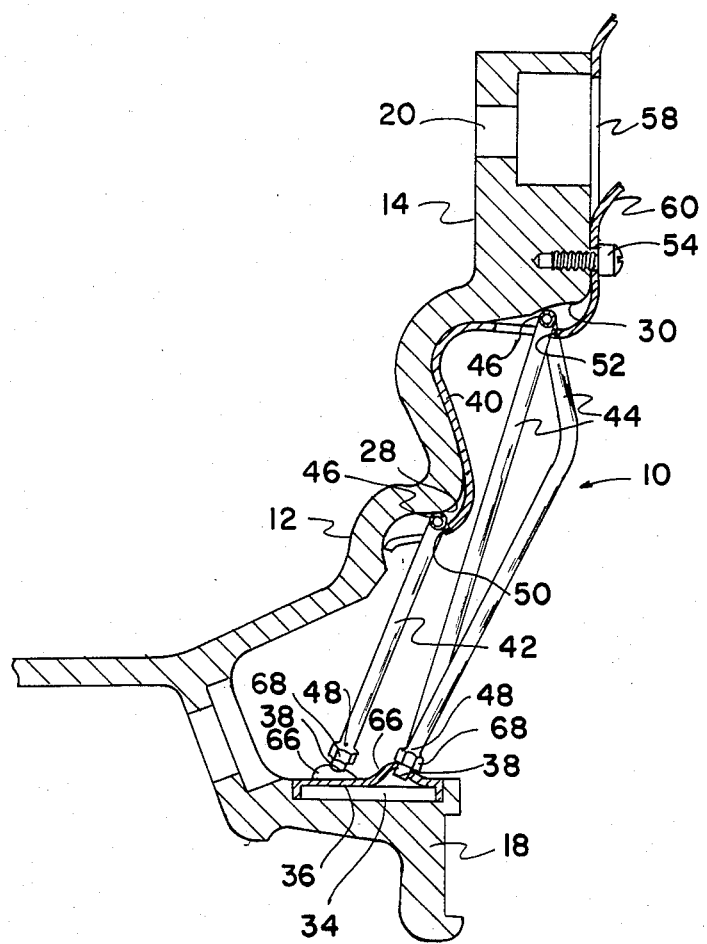
FIG. 5 is a view of the wheel of FIG. 4 including the addition of the ornamental spoke elements.

As seen in FIG. 5, the spoke elements 42, 44 are preferably provided rim ends 48 which include an upset portion 68 which is generally hexagonal and gives the aesthetic appearance of being a threadable fitting. Additionally, the upset portion 68 insures proper seating of the rim end 48 in the opening 38 as it rests against the raised portion 66 and prevents full insertion of the rim end 48 into the opening 38. Providing the preferred spoke elements 42, 44 and the cylindrical element 36 in this manner insures that some biased resilience will exist at the contact of the spoke elements 42, 44 with the cylindrical element 36. In other words, with the hub end 46 of each of the spoke elements 42, 44 being secured in a manner which will be described hereinbelow, the rim end 48 of each of the spoke elements 42, 44 will be generally forced against and under the resilient biasing of the cylindrical element 36 to prevent any rattling or dislocation during operation of the wheel 10.

As seen in FIG. 5 and FIG. 1, each of the spoke elements 42, 44 is preferably formed as the leg of the V-shaped member wherein the hub ends 46 of two adjacent spoke elements 42, 44 are joined. It should also be noted that there are two types of spoke elements 44 which are alternated in the basic design of the preferred wheel 10 in order to allow a crossing pattern of the larger spoke elements 44. Such a pattern is consistent with the normal design for load supporting spokes and improves the overall appearance of the wheel 10.

To assemble the spoke elements 42, 44 on the basic wheel portion 12, the spoke elements 42 are each installed with their rim ends 48 in corresponding openings 38 and their hub ends 46 positioned against the axially extending surface 28. The hub plate 40 is then loosely installed against the outer side 32 of the wheel portion 12 with a series of detents at the edge thereof aligned with each set of joined hub ends 46 to cause the peripheral edge 50 to basically hold the hub ends 36 against the axially extending surface 28. Next, the inwardly positioned half of the spoke elements 44 are installed with their rim ends 48 positioned within their corresponding openings 38 and their joined hub ends 46 extending through the intermediate windows with intermediate edges 52. The alternating, outwardly positioned half of the spoke elements 44 are then installed above the other spoke elements 44 in a similar manner with their joined hub ends 46 extending through their corresponding intermediate windows at the intermediate edges 52. With all of the spoke elements 44 so installed, the joined hub ends 46 will rest against the axially extending surface 30. With the hub plate 40 loosely installed in this manner, the plurality of screws 54 are installed and tightened to axially move the hub plate 40 toward the wheel portion 12 to cause the peripheral edge portions 50 and the intermediate edge portions 52 to provide an axial force to their corresponding hub ends 46 of the spoke elements 42, 44. With the edge portions 50, 52 applying a force to the hub ends 46 in this manner, the hub ends 46 will be securely retained against their corresponding axially extending surfaces 28, 30 and their rim ends 48 will be rigidly held against the raised portions 66 of their corresponding openings 38.

As thus described, the preferred wheel 10 as seen in FIG. 5 can be readily mounted on an axle 24 without interfering with the spoke elements 42, 44 or the hub plate 40 as installed on the wheel portion 12. In other words, the preferred wheel 10 includes ornamental features which, unlike wheel covers, need not be removed for the wheel to be installed on or removed from an axle. After installation of the wheel 10 on an axle 24, the annular ring 56 is simply installed to improve the overall appearance of the wheel 10. It should be clear that any number of alterations to the preferred wheel 10 or the method of making the same could be made without departing from the scope of the invention as claimed.

I claim:

1. A method of forming a wheel having a plurality of ornamental spoke elements on an outer side thereof comprising the steps of:

providing said wheel with a mounting hub and a radial wall portion extending therefrom and terminating at a tire-receiving rim, said radial wall portion having a cross-sectional contour including at least one generally axially extending, radially outwardly facing surface on said outer side located radially between said hub and said rim;

forming a radially inwardly opened circumferential groove on said outer side of said rim;

forming a hub plate to overlie at least a portion of said wall portion with edge portions thereof being located radially outwardly of said axially extending surface;

forming said plurality of said spoke elements with a hub end and a rim end;

forming a cylindrical element with a plurality of openings therein, which said openings are each capable of receiving said rim end of one of said spoke elements;

installing said cylindrical element within said circumferential groove;

installing said spoke elements with said rim ends in corresponding said openings in said cylindrical element and said hub ends resting against said axially extending surface;

installing said hub plate over said wall portion with said edge portions thereof entrapping said hub ends of said spoke elements against said axially extending surface; and securing said hub plate to said wheel.

2. The method of forming a wheel as set forth in claim 1, wherein said wall portion is provided a first of said axially extending surfaces and a second of said axially extending surfaces with said second axially extending surface being concentric with said first axially extending surface and radially inwardly therefrom; said plurality of said spoke elements are formed to include a first set having a first length and second set having a longer, second length; said hub plate is formed with peripheral said edge portions and intermediate said edge portions; said spoke elements are installed with said first set having said hub ends thereof against said first axially extending surface and said second set having said hub ends thereof against said second axially extending surface; and said hub plate is installed with said peripheral edge portions entrapping said hub ends of said first set of said spoke elements against said first axially extending surface and said intermediate edge portions entrapping said hub ends of said second set of said spoke elements against said second axially extending surface.

3. The method of forming a wheel as set forth in claim 1, wherein said cylindrical element is formed of sheet metal and is provided a cylindrical base portion and two radially extending flange portions with said openings being provided in said base portion and said flange portions being installed in and resting against a bottom of said circumferential groove.

4. The method of forming a wheel as set forth in claim 3, further including the steps of providing an upset portion on said rim end of each of said spoke elements and a raised portion about each of said openings in said base portion of said cylindrical element wherein said upset portion of said rim end of said spoke element will rest against said raised portion of said opening to prevent full insertion of said rim end of said spoke element into said opening.

5. The method of forming a wheel as set forth in claim 1, wherein each of said spoke elements is formed as a leg of a V-shaped member wherein said hub ends of two adjacent said spoke elements are joined.

* * * * *